April 19, 1927.
C. B. JACOBS
1,625,610
METHOD OF FURNACING IN THERMOCHEMICAL TREATMENT AND APPARATUS THEREFOR
Filed Feb. 24, 1921
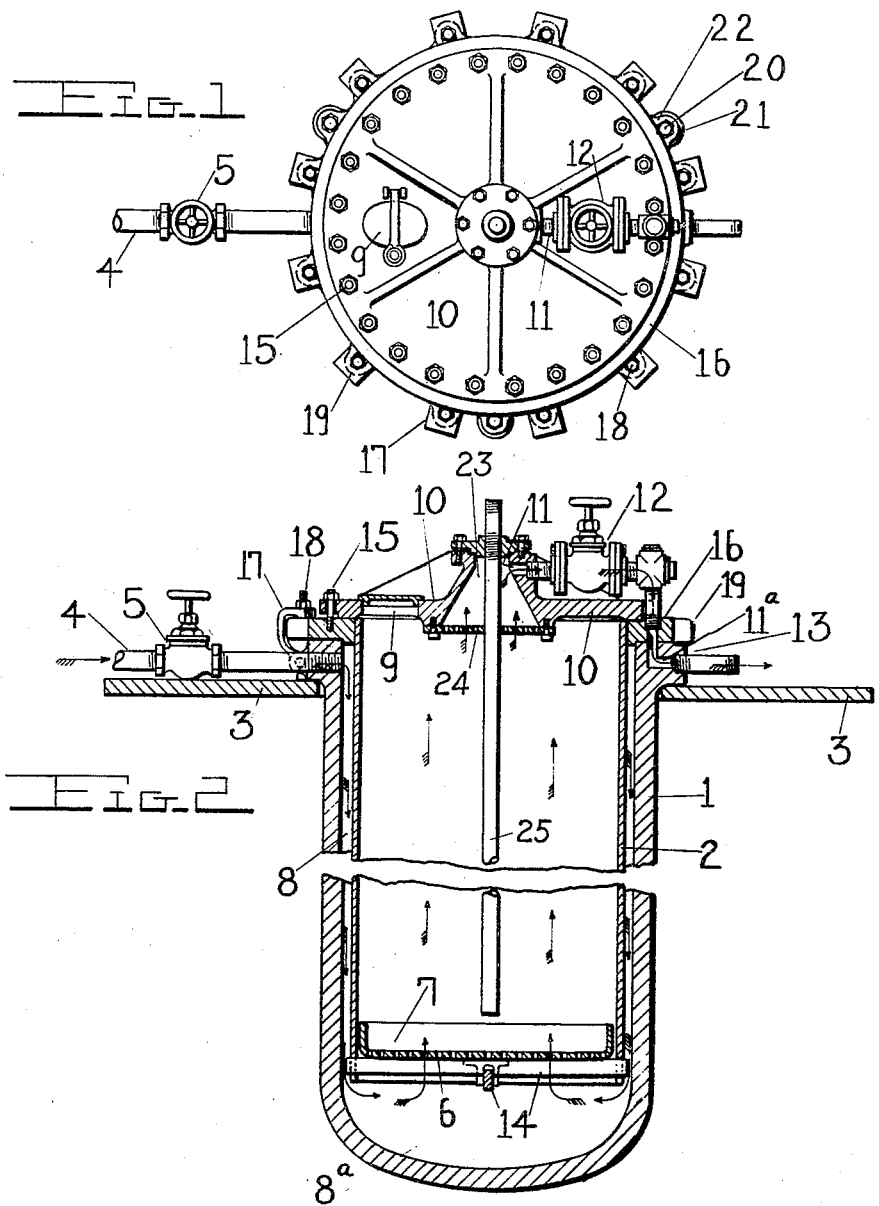
Inventor
C. B. Jacobs,
By F. R. Squair,
Attorney Patented Apr. 19, 1927.

1,625,610

UNITED STATES PATENT OFFICE.

CHARLES B. JACOBS, OF WILMINGTON, DELAWARE, ASSIGNOR TO E. I. DU PONT DE NEMOURS & COMPANY, OF WILMINGTON, DELAWARE, A CORPORATION OF DELAWARE.

METHOD OF FURNACING IN THERMOCHEMICAL TREATMENT AND APPARATUS THEREFOR.

Application filed February 24, 1921. Serial No. 447,592.

This invention is in the art of thermochemical treatment of materials, and relates to a method of furnacing the materials when treating them by the batch, and to apparatus for use in practicing the method. In general, in chemical processes involving thermo-chemical reactions, it is desirable to carry out the operation in a continuous manner. In many instances, however, the nature of the materials used and the limitations necessary for successfully carrying out the reactions involved, do not lend themselves to the conditions necessary for continuous operation. In the treatment of such materials it is necessary to operate by the batch or intermittent method; but this method, as usually practiced, is generally much less economical than the continuous method on account of the smaller output of material in a given time and the greater amount of labor and fuel involved. I have devised a method of, and apparatus for, furnacing whereby, while using the batch method and obtaining the advantages thereof, I can greatly increase the output without substantially increasing the labor and fuel costs, or the furnacing time, over those called for by previous batch methods. It is the object of the invention to provide such a method and apparatus.

The present method has found advantageous application in the production of alkali metal cyanide and, particularly, in the art of making sodium cyanide by heating a batch of sodium carbonate and carbon in the presence of a stream of nitrogen, to produce the cyanide according to the chemical reaction empirically expressed by the equation,

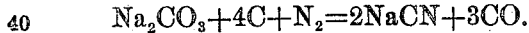

$$Na_2CO_3 + 4C + N_2 = 2NaCN + 3CO.$$

Therefore, I describe it with more particular reference to the production of alkali metal cyanide, but it will be understood that I do not restrict it thereto, since it is applicable to other thermo-chemical treatments in which the batch or charge shrinks.

In carrying out the batch method of thermo-chemical production of alkali metal cyanide, e. g. sodium cyanide, the practice is, of course, to heat the batch in a container or retort, the container having provisions for the passing of nitrogen through the charge during the heating. In working the process my observations of the condition of the retort charges at different stages of the reaction disclosed the facts that shrinkage in volume of the charge began to take place soon after the reaction had started and that this shrinkage amounted to about one-half the original volume of the charge after the reaction had proceeded for about one-quarter of the time required to complete it. Or, in other words, that the reaction temperature was being maintained in the retort for about 75% of the reaction period with the upper half of the retort practically empty.

Now I have discovered that when the charge has shrunk to some extent but the reaction is still going on, an augmenting charge can be filled into the container and the augmenting charge and the original charge treated together, and the treatment completed in substantially no greater time than would have been required for completion of the treatment of the original charge only. And the augmented product from the augmented charge, and obtained, as indicated, without substantial increase in time and at the end of the usual reaction period, will have substantially the same cyanide concentration as has heretofore been obtained with no augmenting or additional charge added.

For example, when the reaction has proceeded about one-quarter of the time required for furnacing the original charge, and the shrinkage has amounted to about one half of the original volume, as mentioned above, an augmenting charge amounting to substantially 50% of the original weight of the charge can be added, and treated with the original charge without substantial increase in the furnacing time, and the cyanide concentration of the product from the augmented charge will be substantially the same as that heretofore obtained when no additional charge had been added, that is, an increase in yield of substantially 50% can be obtained without substantial increase in time, fuel, or labor.

As illustrating results actually obtained by the method, I list below the results of typical runs in which the initial charge was increased to various amounts during the furnacing operation, in comparison with results obtained with initial charges which were not increased,—other conditions such as composition of charge, temperature of reaction and time for which the charge was subjected to nitrogen, being the same:

| Run. | Added chg. % by wt. original chg. | Increase in furnacing time (min.). | NaCN in product % by wt. |
|---|---|---|---|
| 1 | 60 | 30 | 46.45 |
| 2 | None. | None. | 53.39 |
| 3 | 66 | 30 | 45.80 |
| 4 | 66 | 30 | 46.92 |
| 5 | 66 | 30 | 42.20 |
| 6 | None. | None. | 42.56 |
| 7 | 50 | 30 | 52.37 |
| 8 | None. | None. | 52.70 |
| 9 | 50 | 15 | 47.64 |
| 10 | None. | None. | 55.34 |

Inspection of the above table shows that when the added charge amounted to as much as 66% by weight of the initial charge, a high concentration of cyanide in the resulting product was obtained, and that when the charge added was 50% by weight of the initial charge substantially the same concentration of cyanide was obtained in the augmented charge as when the initial charge was furnaced without any additional charge. In all cases this method of operation resulted in a substantial increase in the amount of cyanide produced in a given time for substantially the same expenditure of fuel and labor.

Although, as appears from the table, the furnacing time was increased somewhat, it will be understood that this increase is substantially increase in manipulation time merely, due to opening and closing the retort to fill in the augmenting charge, and is substantially not increase in reaction time or time during which nitrogen is supplied. This increase in manipulation time is, of course, subject to material reduction with increase in expertness of the workmen and, in any case, is but a small percent of the time required for the ordinary method of operating, which time frequently amounts to ten hours or longer depending on the size of the charge.

Desirably, the method may be carried out using an apparatus of the character of that shown in the accompanying drawing, in which Figure 1 is a top plan view and Figure 2 is substantially a vertical diametrical section, with the intermediate portion broken out to economize space. The illustrated apparatus comprises, in general, an outer retort member, or receptacle, 1, and an inner retort member, receptacle, envelope, or batch container, 2. The outer receptacle is permanently received in the furnace setting 3, while the inner receptacle is removably received in the outer receptacle; both are of heat-transmitting material. The outer receptacle is provided with a nitrogen supply pipe 4, valved at 5, and the inner receptacle is of somewhat less diameter and length than the outer receptacle and has perforations 6 in its bottom 7, to provide a nitrogen passage 8—8ª—6. The inner member has an augmenting-charge filling hole 9 in its top 10 and is provided with a gas escape 11, valved at 12, the rim 13 of the outer member having a passage 11ª forming an extension of the escape 11. The bottom 7 of the inner member is removably locked to the body of the member by a pair of locking bars 14, 14, of a size to substantially not obstruct the passage of the nitrogen, and its top 10 is bolted at 15 to the top flange 16 attached to the body of the inner member. The two members are assembled with each other by resting the flange 16 of the envelope on the rim 13 of the outer member, and connecting them by swinging over the clamp arms 17, hinged to the rim 13 and bolting them at 18 to the ears 19 of the flange 16, bolts 20, connecting ears 21 and 22 on the rim 13 and the flange 16 respectively, also being used. Desirably the top 10 is provided with a dome-like entrance 23 to the passage 11 and with a perforated shield plate 24, also the top may carry a thermo-couple pipe 25. A plurality of envelopes such as 2 are preferably provided for use with the member 1.

It will be seen that the described apparatus provides for removing a finished batch from the furnace and cooling it while unassociated with the furnace; thus cooling of the furnace in order to cool the batch can be avoided and, furthermore, a second envelope containing a batch to be furnaced can be introduced into the outer member 1 immediately the first envelope has been removed and, so, much time and fuel saved, as compared to the usual batch method. While the present method is not confined to a practice which takes advantage of the batch removal and cooling features of the apparatus, as is evident, it is highly advantageous to utilize those features and, as a specific example, the procedure may be as follows:—

The envelope 2, with its top attached and the opening 9 closed, is filled from the bottom with the initial charge which may consist of 40% $Na_2CO_3$, 40% C and 20% oxide of iron by weight and be sufficient in amount to fill the inner member to substantially level with the top of the furnace setting, the bottom 7 is locked in place, and the envelope is introduced into the already heated retort 1 and clamped thereto, then the valve 5 is opened to give the flow of nitrogen, the valve 12 is opened for the escape of carbon monoxide and excess nitrogen, and the furnacing proceeded with at a temperature of, say, 900° to 1000° C. At the expiration of about one-quarter of the furnacing time required for the charge, and when the charge has shrunk and dropped down so that the upper half of the envelope is practically empty; the valves 5 and 12 are closed, the filling hole 9 is opened and an additional charge of substantially the same character as the original charge and amounting to approximately 50% by weight of the original charge, is fed in. The charging hole is now closed, the valves 5 and 12 opened and the operation continued in the same manner as before. Upon completion of the furnacing the valves 5 and 12 are closed, the clamps 17 and bolts 20 released, and the envelope 2, with its top thereon and the hole 9 closed, is removed while hot, to be cooled unassociated with the furnace. Upon removal of the envelope, a second envelope (not shown) and containing another charge is introduced and this second is furnaced and augmented as was the first, and so on. Should for any reason it be desired, the method may of course be carried out substantially as outlined but with the omission of the cooling of the first batch unassociated with the furnace, and the omission of the immediate introduction of the second batch.

I claim:—

1. The method of furnacing, in the art of carrying on synthetic reactions by the thermo-chemical treatment by the batch method of charges which shrink during treatment, which comprises, carrying on the treatment of a batch until a substantial shrinkage has occurred, adding to the batch an augmenting charge at a time substantially prior to the completion of the treatment of the original batch, and treating the augmented batch until completion.

2. The method of furnacing, in the thermo-chemical treatment by the batch method of alkali metal carbonate and carbon charges to produce alkali metal cyanide, which comprises, carrying on the treatment of a batch until a substantial shrinkage has occurred, adding to the batch an augmenting charge similar to the original charge, and treating the augmented batch until completion.

3. The method of furnacing, in the thermo-chemical treatment by the batch method of alkali metal carbonate and carbon charges to produce alkali metal cyanide, which comprises, carrying on the treatment of a batch until a substantial shrinkage has occurred, adding to the batch, at a time substantially prior to the completion of the treatment thereof, an augmenting charge similar to the original charge, and treating the augmented batch until completion.

4. The method of furnacing, in the thermo-chemical treatment by the batch method of sodium carbonate and carbon charges to produce sodium cyanide, which comprises, carrying on the treatment of a batch until a substantial shrinkage has occurred, adding to the batch an augmenting charge similar to the original charge, and treating the augmented batch until completion.

5. The method of furnacing, in the thermo-chemical treatment by the batch method of sodium carbonate and carbon charges to produce sodium cyanide, which comprises, carrying on the treatment of a batch until a substantial shrinkage has occurred, adding to the batch, at a time substantially prior to the completion of the treatment thereof, an augmenting charge similar to the original charge, and treating the augmented batch until completion.

6. The method of furnacing, in the thermo-chemical treatment by the batch method of sodium carbonate and carbon charges to produce sodium cyanide, which comprises, carrying on the treatment of a batch for substantially one quarter of the full required reaction time, adding to the batch an augmenting charge similar to the original charge and amounting to about 50% by weight of the original charge, and treating the augmented batch for substantially the same time as would have been required to complete the treatment of the original unaugmented batch.

7. The method of conserving heat in furnacing in the thermo-chemical treatment by the batch method of charges which shrink during treatment which comprises placing the batch, contained in a receptacle, into a heating receptacle, carrying on the treatment until a substantial shrinkage of the batch has occurred, adding an augmenting charge to the batch, treating the augmented batch until completion, removing the batch while still contained in the containing receptacle, and cooling the batch while thus removed.

8. The method of conserving heat in furnacing in the thermo-chemical treatment by the batch method of charges which shrink during treatment which comprises placing the batch, contained in a receptacle, in a heating receptacle, carrying on the treatment until a substantial shrinkage of the batch has occurred, adding an augmenting charge to the batch, treating the augmented batch until completion, removing the batch while still contained in the containing receptacle, cooling the batch while thus removed, introducing a second receptacle-contained batch into the heating receptacle while such receptacle retains the heat acquired in the treatment of the first batch, and carrying on the treatment of the second batch.

9. The method of conserving heat in furnacing in the thermo-chemical treatment by the batch method of sodium carbonate and carbon charges to produce sodium cyanide which comprises placing the batch, contained in a receptacle, in a heating receptacle, carrying on the treatment for substantially one quarter of the full reaction time, adding an augmenting charge to the batch similar to the original charge and amounting to about 50% by weight of the original charge, treating the augmented batch for substantially the same time as would have been required to complete the treatment of the original unaugmented batch, removing the batch while still contained in the containing receptacle, cooling the batch while thus removed, introducing a second receptacle-contained batch into the heating receptacle while such receptacle retains the heat acquired in the treatment of the first batch, and carrying on the treatment of the second batch.

10. The method of conserving heat in furnacing in the thermo-chemical treatment by the batch method of charges which shrink during treatment, which comprises, making use of an inner-and-outer-receptacle apparatus with the outer receptacle fixed in a heating means, introducing the inner receptacle, containing a batch, into the outer receptacle, carrying on the treatment until a substantial shrinkage has occurred, adding to the batch an augmenting charge, treating the augmented batch until completion, removing the inner receptacle while hot together with the augmented batch, and cooling the batch while unassociated with the outer receptacle.

11. The method of conserving heat in furnacing in the thermo-chemical treatment by the batch method of charges which shrink during treatment, which comprises, making use of a plurality of inner receptacles and an outer receptacle, with the outer receptacle fixed in a heating means, introducing an inner receptacle, containing a batch, into the outer receptacle, carrying on the treatment until a substantial shrinkage has occurred, adding to the batch an augmenting charge, treating the augmented batch until completion, removing the inner receptacle while hot together with the augmented batch without substantial cooling of the outer receptacle, introducing a second batch, contained in a second inner receptacle, into the outer receptacle while such outer receptacle retains the heat acquired in the treatment of the first batch, and carrying on the treatment of the second batch.

12. The method of conserving heat in furnacing, in the thermo-chemical treatment by the batch method of sodium carbonate and carbon charges to produce sodium cyanide, which comprises, making use of a plurality of inner receptacles and an outer receptacle, with the outer receptacle fixed in a heating means, introducing an inner receptacle, containing a batch, into the outer receptacle, carrying on the treatment of the batch for substantially one-quarter of the full reaction time, adding to the batch an augmenting charge similar to the original charge and amounting to about 50% by weight of the original charge, treating the augmented batch for substantially the same time as would have been required to complete the treatment of the original unaugmented batch, removing the inner receptacle while hot together with the augmented batch without substantial cooling of the outer receptacle, introducing a second batch, contained in a second inner receptacle, into the outer receptacle while such outer receptacle retains the heat acquired in the treatment of the first batch, and carrying on the treatment of the second batch.

In testimony whereof I affix my signature.

CHARLES B. JACOBS.